Patented June 11, 1929.

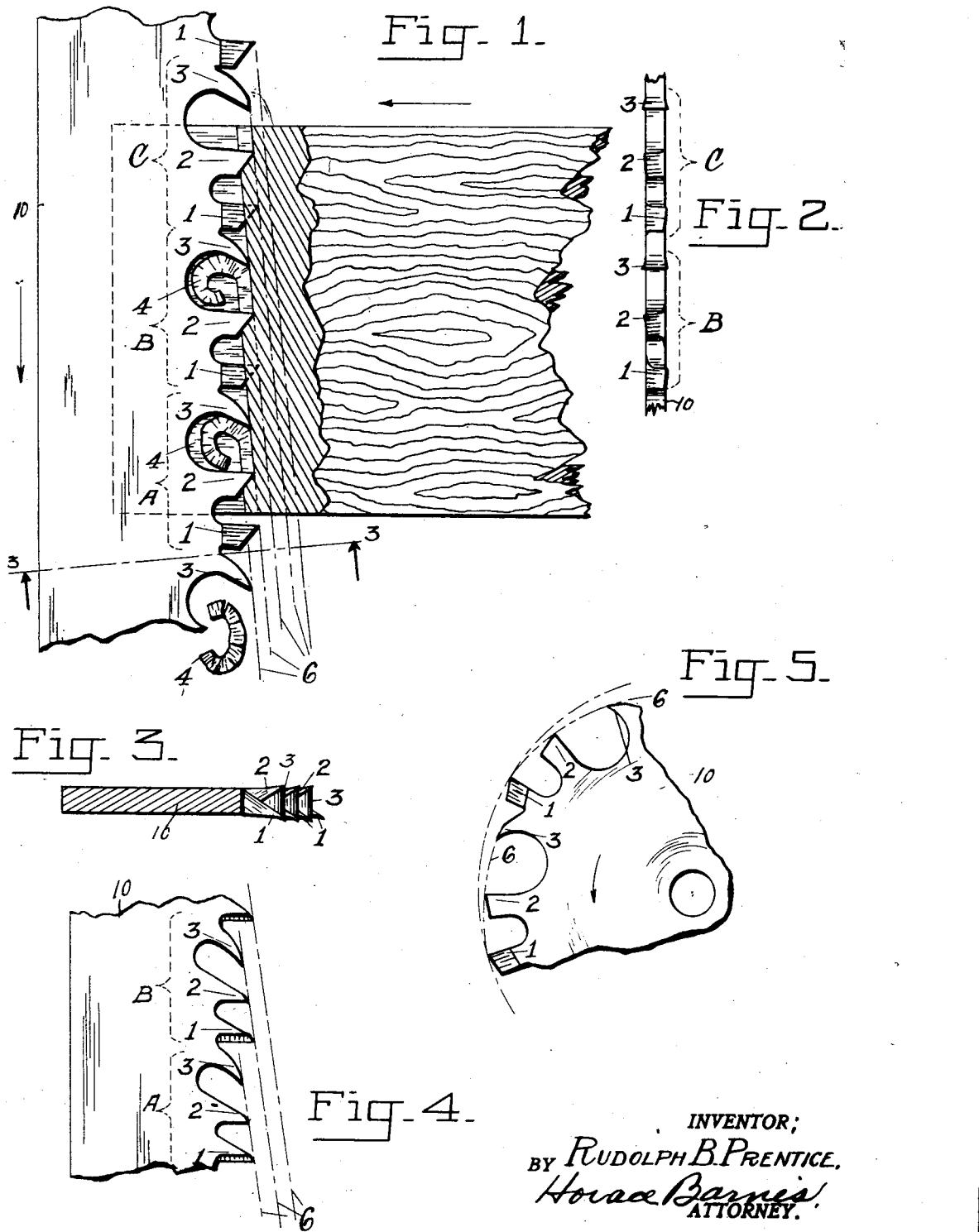

1,716,976

UNITED STATES PATENT OFFICE.

RUDOLPH B. PRENTICE, OF PORTLAND, OREGON, ASSIGNOR OF ONE-HALF TO HORACE BARNES, OF PORTLAND, OREGON.

SAW.

Application filed October 31, 1927. Serial No. 229,845.

The primary object of my invention is to provide a cutting tool such as a saw or milling cutter having teeth or bits formed and arranged to render cutting operations more economical of power.

A second object is to increase the durability of the tool and to improve the quality of the work.

A third object is to provide a cutter adapted to cutting wood without reference to the direction of the grain thereof.

Other objects and advantages of my invention, and objects relating to details of construction and arrangement of parts, will be readily apparent in the course of the detailed description to follow.

The accompanying drawings illustrate by way of example two preferred forms of my invention, in which:

Figure 1 is a fragmentary view in side elevation of a saw embodying my invention illustrated in operation upon a block of wood, in which the various functions of the cutting bits are indicated.

Fig. 2 is a fragmentary edge view of the toothed edge of the saw shown in Fig. 1.

Fig. 3 is a view in cross section on line 3—3 of Fig. 1.

Fig. 4 is a fragmentary view in side elevation of a saw blade slightly modified from that illustrated in Fig. 1 and adapted to hand sawing or hand fed band sawing.

Fig. 5 is a fragmentary view in side elevation of a circular saw embodying my invention.

Referring to said views, in which similar characters of reference indicate like parts in the several views, the reference numeral 10 indicates a saw or cutting tool of any suitable form having a plurality of groups A, B, and C, of saw teeth or cutting bits, each said group being composed of bits 1, 2, and 3, respectively formed to effect complementary operations in the excision of a definite portion of the kerf wood, as indicated at 4.

In each said group the advance bit 1 is of maximum length and may be of any suitable form to cut one side of the saw kerf to the predetermined depth of the material to be removed by the group. The bit 2 next adjacent the advance bit is of slightly less length and is formed to cut along the kerf line opposite to that of the bit 1. The bit 3 is formed as a raker bit and is of slightly less length than the bit 2 and is arranged to remove the wood of the saw kerf to the depth incised by the bits 1 and 2. The extremities of said bits of each group are all brought to a line, hereinafter called the pitch line, inclined to a line parallel with the major axis of the saw or tool or to the line of motion of the saw with respect to an observer. The pitch lines of the respective groups will be parallel to each other, and the respective bits designated by the same numerals 1, 2, or 3 of the various groups will be of the same length and on parallel planes with the saw axis.

It will be observed that the extremities of teeth composing each group are aligned with reference to the pitch lines 6, while all similar bits throughout all the groups are further aligned with reference to the line of motion of the saw with respect to an observer. Since the various pitch lines 6 are not parallel with the line of motion of the saw, the individual bits composing one group are of different lengths, the lengths of the bits varying inversely as the distance from the point of origin on the cutting edge of the saw of the particular pitch line to which it is aligned.

Thus, if the bits of the saw shown in Fig. 1 be viewed with the line of sight coincident with a pitch line, the bit 3 will appear of equal height with both the bits 1 and 2 as indicated in Fig. 3.

The bits in the saws illustrated are further formed in detail as follows: The number 1 bits are sharpened as side cutters, the number 2 bits as opposite side cutters, and the number 3 bits as bottom cutters.

In Fig. 4, the adaptation to hand saws, the side cutters 1 and 2 are sharpened to cut on the edge approximately perpendicular to the pitch lines to relieve a user of tiring muscular strain in keeping the bits properly engaged with the work.

The especial form of the side cutters represented in Figs. 1, 2, 3, and 5, are particularly adapted to machines or hand saws when smoothness of the cut surface is of prime importance. It will be noticed that these number 1 and 2 side cutters have a shearing action, and the rear point only enters the new cut.

The manner of operation of the tool is as follows:

The angle included between the pitch lines and the line of motion of the saw is of a magnitude determined by the ratio of the speed of feed of the wood toward the saw to the speed of the bits of the saw past the work. This pitch line may be generated upon the saw blade by a fixed point in the wood when both saw and wood are moving at the desired operative speeds. From this it will be apparent that all bits aligned with reference to a pitch line so generated will cut to an even depth.

A pitch line so generated upon a rotating cutting tool or a rotatively stationary tool against which the material to be cut revolves will be of spiral figure. Pitch lines will be straight when the motions of the cutting tool and material to be cut are rectilinear.

In Fig. 1 it will be observed that the side cutters 1 and 2 score the wood on both sides of the kerf and the bottom cutters 3 provided with deep gullets remove the shaving so defined by the side cutters.

This construction and arrangement of bits is applicable to saws and cutters for work in any material where a progressive cutting is desirable and wherein the cutting is accomplished by a series of successively occurring complementary operations.

It will be apparent that the device may be embodied in cutting off tools used in lathes and other tools contemplating a uniformly progressive action wherein a plurality of complementary operations effect the excision of a portion of the material to accomplish a division thereof.

Having described my invention, what I claim, is:

1. A saw having a plurality of groups of teeth arranged symmetrically along the edge of the saw, each said group of teeth having a tooth adapted to cut the side edges of the saw kerf, respectively, and a raker tooth adapted to remove the material cut, the teeth of each said group being arranged with their cutting ends disposed in a line inclined to the path of the saw.

2. A cutting tool armed with bits arranged in symmetrical groups component bits of which are adapted to effect a plurality of successively occurring complementary cutting operations and wherein the bits composing each group are aligned with reference to a pitch line generated upon the tool by the movement of a fixed point in the material being cut when both tool and material are in operatively relative motion.

3. A cutting tool adapted to be driven in synchronism with a means for feeding the material to be cut, comprising a plurality of symmetrical groups of bits adapted to effect a plurality of successively occurring complementary cutting operations, the extreme points of which bits are aligned with reference to a line generated upon the tool by a fixed point in the material being cut when both material and tool are in operative motion at the desired speeds.

4. A cutting tool armed with symmetrical groups of bits adapted to effect a plurality of successively occurring complementary sections of uniform depth measured upon lines parallel with which the material being cut moves.

5. A cutting tool in which the bits are arranged in symmetrical groups the bits of which are adapted to performing complementary cutting operations and in which the cutting ends of the bits composing each group are aligned with respect to a line parallel with the movement of the tool with respect to the material being cut and through which it moves.

6. A saw having a plurality of groups of teeth arranged symmetrically, each said group of teeth having two side cutting teeth of similar shape but of different length and one bottom cutting tooth, the ends of said teeth being aligned with reference to a pitch line generated on the saw by a fixed point in the material being cut when both saw and material are in relative, operative motion.

7. A saw having a plurality of groups of teeth, each composed of a side cutting tooth of greatest length, an opposite side cutting tooth of medium length, and a bottom cutting tooth of shortest length, arranged in the order named.

8. A saw having a plurality of groups of teeth each composed of a side cutting tooth, a similar opposite side cutting tooth of slightly less length, and a bottom cutting tooth of still shorter length, arranged in the order named, said teeth having their ends aligned upon a pitch line determined by the rate of speed of feed of the material being cut relative to the speed of the saw.

RUDOLPH B. PRENTICE.